(12) United States Patent
Wade et al.

(10) Patent No.: US 11,772,476 B2
(45) Date of Patent: Oct. 3, 2023

(54) UTILITY VEHICLE AUTOMATIC TRANSMISSION POWERTRAIN MOUNTING

(71) Applicant: DEERE & COMPANY, Moline, IL (US)

(72) Inventors: Jeremie A. Wade, Haw River, NC (US); Rupali Patil, Jalgaon (IN); Larry D. Swanson, Horicon, WI (US)

(73) Assignee: DEERE & COMPANY, Moline, IL (US)

( * ) Notice: Subject to any disclaimer, the term of this patent is extended or adjusted under 35 U.S.C. 154(b) by 517 days.

(21) Appl. No.: 17/009,168

(22) Filed: Sep. 1, 2020

(65) Prior Publication Data

US 2022/0041043 A1 Feb. 10, 2022

(30) Foreign Application Priority Data

Aug. 6, 2020 (IN) .............................. 202021033709

(51) Int. Cl.
*B60K 17/00* (2006.01)
*B60K 5/12* (2006.01)

(52) U.S. Cl.
CPC ............ *B60K 5/1216* (2013.01); *B60K 17/00* (2013.01)

(58) Field of Classification Search
CPC .............................. B60K 5/1216; B60K 17/00
See application file for complete search history.

(56) References Cited

U.S. PATENT DOCUMENTS 4,610,421 A * 9/1986 Ohta .................... B60K 5/1216
180/297
4,917,207 A 4/1990 Yasui et al.
5,566,591 A 10/1996 Burkett
6,648,093 B2 11/2003 Rioux et al.
6,742,619 B2 6/2004 Farbotnik et al.
7,287,769 B2 10/2007 Thiemke et al.
7,343,998 B2 3/2008 Morin et al.
7,438,153 B2 10/2008 Kalsnes et al.
7,506,718 B2 3/2009 Morita et al.
8,256,563 B2 9/2012 Suzuki et al.
(Continued)

FOREIGN PATENT DOCUMENTS

JP H05301526 A 11/1993
WO WO-8905245 A1 * 6/1989
(Continued)

OTHER PUBLICATIONS

Great Britain Search & Examination Report issued in application No. GB2110823.8 dated Jan. 6, 2022 (08 pages).

*Primary Examiner* — Jacob B Meyer

(57) ABSTRACT

A utility vehicle automatic transmission powertrain mounting includes a front isolator under an internal combustion engine, a pair of mid isolators under an adapter plate between the internal combustion engine and an automatic transmission, and a rear isolator over the automatic transmission. Each of the isolators is on a frame member of a rear portion of an off road or recreational utility vehicle frame. The utility vehicle powertrain mounting may be used with multiple engine options on off road or recreational utility vehicles having powertrains behind the seats and under the cargo bed. The utility vehicle powertrain mounting provides easy access to service, repair or replace the transmission, and provides support and stability for the engine during transmission work.

12 Claims, 6 Drawing Sheets

(56) References Cited

U.S. PATENT DOCUMENTS

| | | | |
|---|---|---|---|
| 8,517,136 B2 | 8/2013 | Hurd et al. | |
| 8,522,911 B2 | 9/2013 | Hurd et al. | |
| 8,574,111 B2 | 11/2013 | Wade et al. | |
| 8,596,405 B2 | 12/2013 | Sunsdahl et al. | |
| 8,727,063 B1* | 5/2014 | Yamamoto | B60K 5/1216 180/312 |
| 8,776,939 B2 | 7/2014 | Kuramoto | |
| 9,045,031 B2 | 6/2015 | Kouma et al. | |
| D756,845 S | 5/2016 | Flores | |
| 9,499,037 B2 | 11/2016 | Yamamoto et al. | |
| 9,718,351 B2 | 8/2017 | Ripley et al. | |
| 9,809,102 B2 | 11/2017 | Sunsdahl et al. | |
| 9,909,659 B2 | 3/2018 | Bessho et al. | |
| 2002/0144852 A1* | 10/2002 | Shimizu | B62K 5/01 180/300 |
| 2002/0166711 A1* | 11/2002 | Witherspoon | B60K 5/1216 180/312 |
| 2008/0054538 A1* | 3/2008 | Igami | B60K 5/1216 180/291 |
| 2012/0090912 A1* | 4/2012 | Gannon | B60K 5/1216 180/312 |
| 2013/0048406 A1* | 2/2013 | Kuramoto | B60K 5/1216 180/291 |
| 2013/0068552 A1* | 3/2013 | Kim | B60K 5/1216 180/300 |
| 2013/0319785 A1 | 12/2013 | Spindler et al. | |
| 2014/0187372 A1* | 7/2014 | Kouma | B60K 5/1216 474/150 |
| 2014/0367547 A1* | 12/2014 | Ohnishi | F16F 1/3835 267/141 |
| 2016/0185203 A1 | 6/2016 | Ohshita et al. | |
| 2016/0288637 A1* | 10/2016 | Yamamoto | B60K 5/12 |
| 2016/0311302 A1* | 10/2016 | Uki | B60K 5/1241 |
| 2017/0074385 A1* | 3/2017 | Rosendahl | F16F 15/08 |
| 2018/0326843 A1 | 11/2018 | Danielson et al. | |
| 2020/0238814 A1* | 7/2020 | Kodama | B60K 5/1208 |
| 2022/0041043 A1* | 2/2022 | Wade | B60K 17/00 |

FOREIGN PATENT DOCUMENTS

| | | | |
|---|---|---|---|
| WO | WO-8905246 A1 * | 6/1989 | |
| WO | WO-2015173304 A1 * | 11/2015 | B60K 17/00 |

* cited by examiner

UTILITY VEHICLE AUTOMATIC TRANSMISSION POWERTRAIN MOUNTING

CROSS REFERENCE TO RELATED APPLICATIONS

This application claims priority under 35 USC 119 to Indian patent application 202021033709 filed Aug. 6, 2020, the disclosure of which is incorporated herein by reference.

FIELD OF THE INVENTION

This invention relates to off-road and recreational utility vehicles, and more specifically to a utility vehicle automatic transmission powertrain mounting.

BACKGROUND OF THE INVENTION

Utility vehicles for off-road and recreational use typically have internal combustion engines and transmissions mounted to frame members adjacent the rear of the vehicle frame, behind the operator and passenger seats and under the cargo bed. Many utility vehicles have rear mounted engines that are oriented transversely to the vehicle frame and direction of travel, and belt driven continuously variable transmissions positioned on one side of the engine. Examples include U.S. Pat. No. 7,287,769 for Retention for Utility Vehicle Drive Train Sub-Frame; U.S. Pat. No. 7,506,718 for Utility Vehicle and Assembly of Engine and Transmission for Utility Vehicle; U.S. Pat. No. 8,727,063 for Mounting Structure of Power Unit for a Utility Vehicle; U.S. Pat. No. 7,343,998 for All-Terrain Vehicle with Subtransmission Detachably Mounted to the Engine; U.S. Pat. No. 8,256,563 for All Terrain Vehicle, and U.S. Pat. No. 9,909,659 for Work Vehicle.

Some other off-road and recreational utility vehicles have powertrains where the transmission and engine are mounted together, or the transmission is mounted directly ahead or behind the engine. For example, the engine and transmission may be mounted together as a modular assembly, or the transmission may be integrated into the engine crankcase, or the engine and transmission may be mounted under the seats, or offset to the side of the vehicle. Examples include U.S. Pat. No. 8,596,405 for Side-By-Side ATV; U.S. Pat. No. 7,438,153 for All-Terrain Vehicle Engine Configuration; U.S. Pat. No. 6,648,093 for Engine Mounting Structure for All Terrain Vehicle; and U.S. Pat. No. 8,517,136 for Vehicle.

A utility vehicle automatic transmission powertrain mounting is needed that may be used with multiple engine options. A utility vehicle automatic transmission powertrain mounting is needed behind the seats and under the cargo bed of the utility vehicle, that provides easy access to service, repair or replace the transmission. A utility vehicle automatic transmission powertrain mounting is needed that has support and stability for the engine when servicing or removing the transmission.

SUMMARY OF THE INVENTION

A utility vehicle automatic transmission powertrain mounting includes a front isolator on a first frame member of a rear portion of a utility vehicle frame, which may be connected to a front portion of an engine. The powertrain mounting also includes a pair of mid isolators, each mid isolator on a second inclined frame member of the rear portion of the utility vehicle frame, each mid isolator connected to an adapter plate between the engine and an automatic transmission. The powertrain mounting also includes a rear isolator on a third frame member that extends transversely across the rear portion of the utility vehicle frame; the rear isolator connected to the automatic transmission.

The utility vehicle automatic transmission powertrain mounting may be used with multiple engine options. It is behind the seats and under the cargo bed of the utility vehicle, and provides easy access to service, repair or replace the transmission. The powertrain mounting also provides necessary support and stability for the engine when servicing or removing the transmission.

DESCRIPTION OF THE PREFERRED EMBODIMENT

Figure 1:
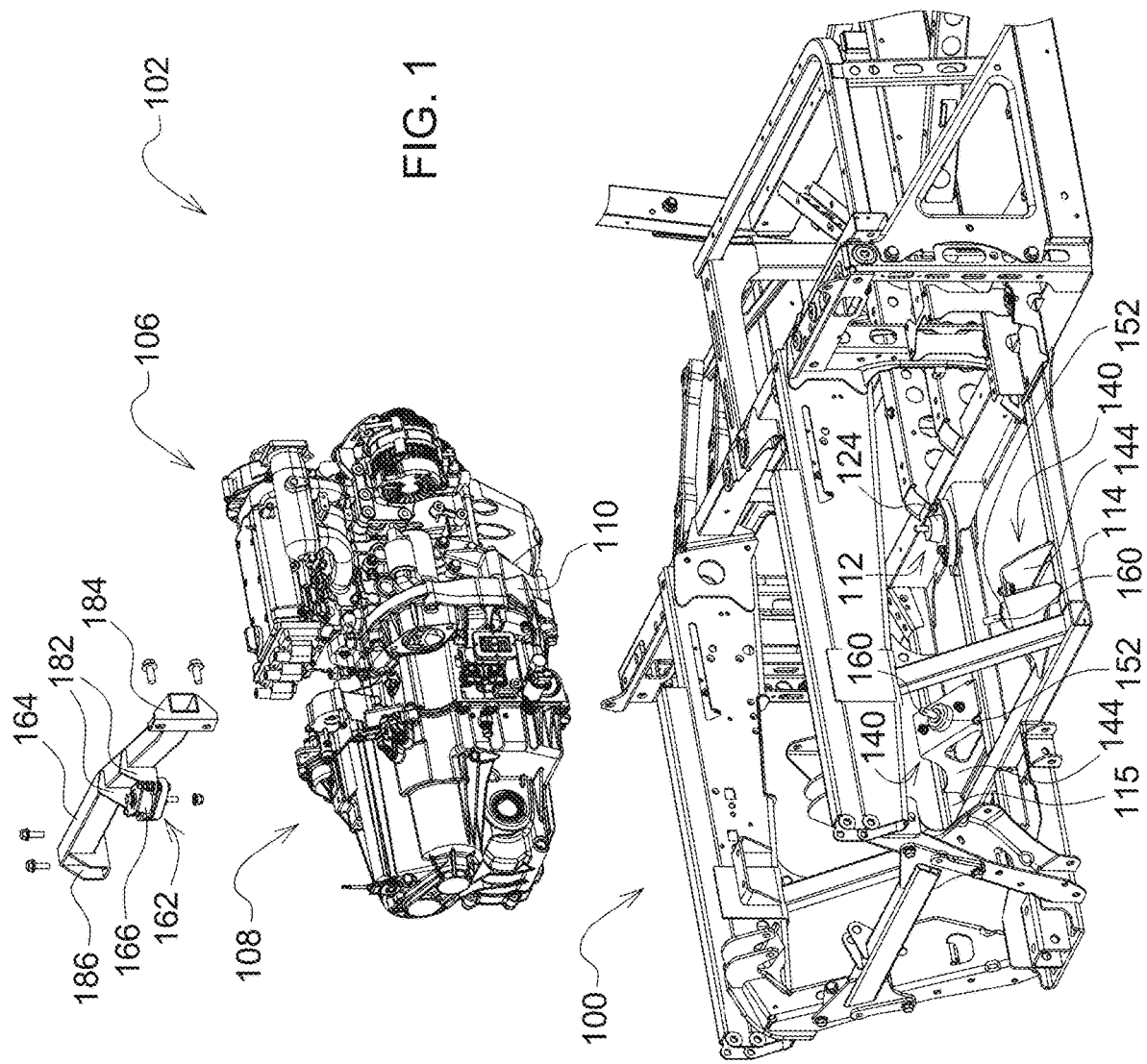
FIG. 1 is a partially exploded perspective view of a utility vehicle automatic transmission powertrain mounting on the rear portion of a utility vehicle frame according to a first embodiment of the invention.
Figure 2:
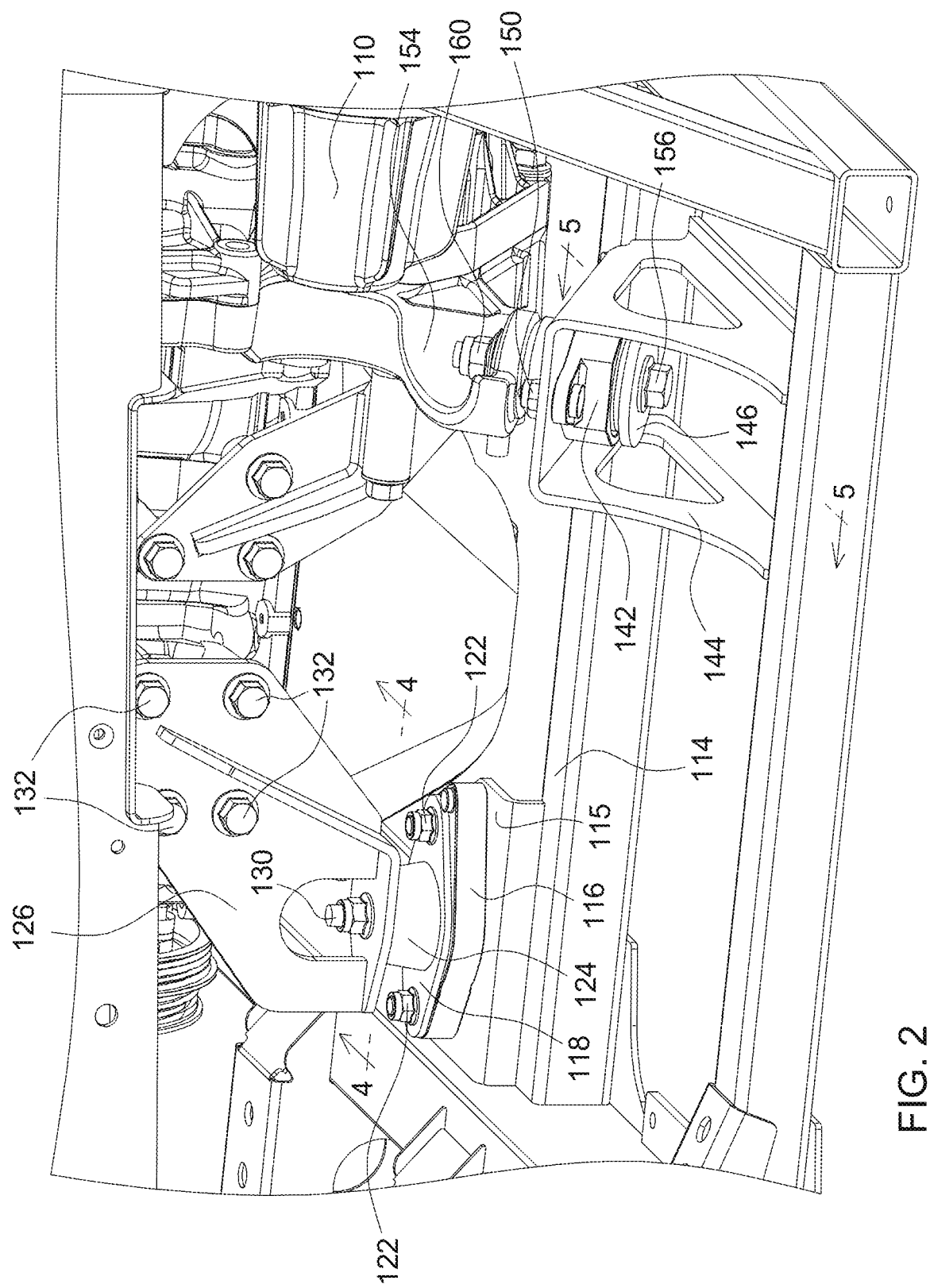
FIG. 2 is a perspective view of a front isolator and mid isolator of a utility vehicle automatic transmission powertrain mounting according to a first embodiment of the invention.
Figure 3:
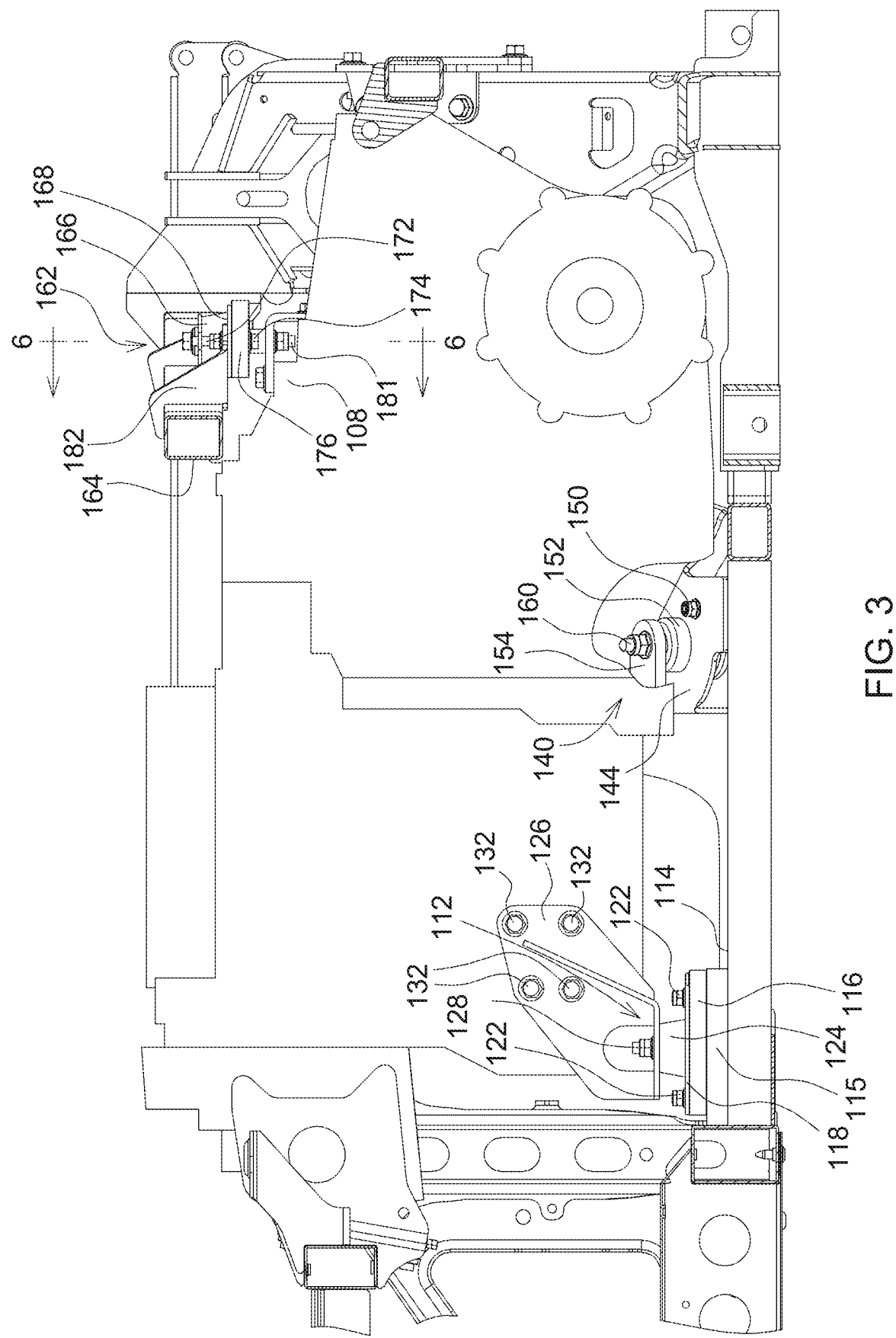
FIG. 3 is a side view in section of a utility vehicle automatic transmission powertrain mounting according to a first embodiment of the invention.

In one embodiment shown in FIGS. 1-3, utility vehicle automatic transmission powertrain mounting 100 may support utility vehicle powertrain 102 including internal combustion engine 106 and transmission 108 on the rear portion of the frame of an off-road or recreational utility vehicle. Internal combustion engine 106 preferably may be a two or three cylinder gasoline or diesel engine, having a displacement between about 500 cc and about 1500 cc, and transmission 108 may be an automatic transmission with a dual clutch. However, other engines and automatic transmissions may be mounted. FIG. 1 shows the rear portion of a utility vehicle frame where the powertrain may be mounted. Both the engine and transmission are mounted to the rear of the frame behind the operator and passenger seats and below the cargo box of the utility vehicle. The powertrain mounting may have a longitudinal layout where the internal combustion engine 106 is positioned ahead of the automatic transmission 108. Front and/or rear output shafts may extend generally forwardly and/or rearwardly from the internal combustion engine. Adapter plate 110 may connect between the engine and automatic transmission, and the same powertrain mounting may be used for different engines with the same transmission, and/or different transmissions with the same engine. The adapter plate may be attached to both the engine and the transmission housing using threaded fasteners or other connectors that may be oriented parallel to the front and/or rear output shafts.

In one embodiment, utility vehicle automatic transmission powertrain mounting 100 may include four isolators. The four isolators may be used with multiple different engine options and provide common mounting points for the engines. The four isolators may include front isolator 112, a pair of mid isolators 140, and a rear upper isolator 162. The four isolators may be positioned in a diamond shaped configuration as viewed from above or below. The front isolator and pair of mid isolators may provide support and stability of the engine when the automatic transmission is serviced without removal of the engine. The rear upper isolator may be attached to a removable, modular cross member 164 which also provides easy access for service or removal of the transmission.

Figure 4:
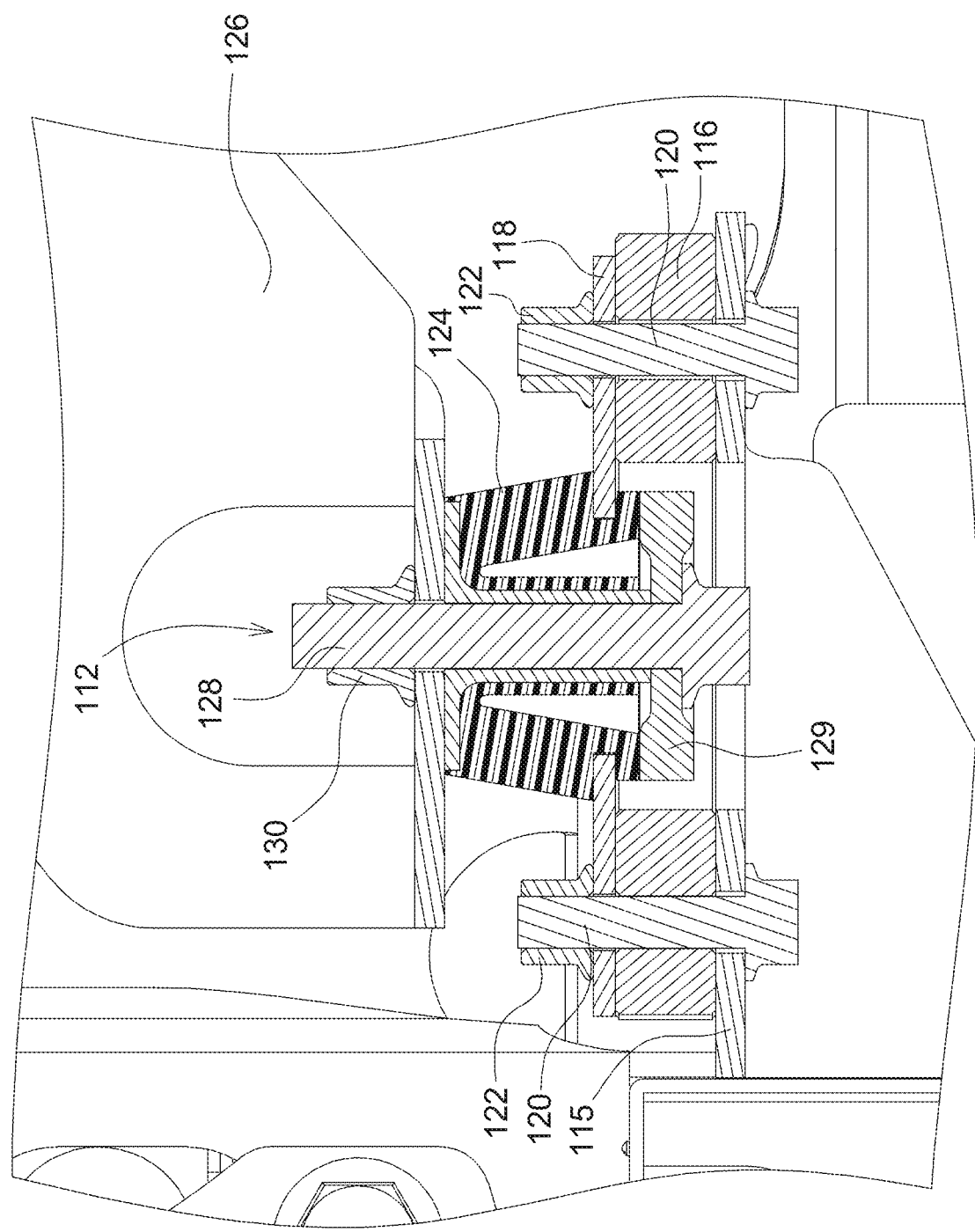
FIG. 4 is a cross section of a front isolator of a utility vehicle automatic transmission powertrain mounting according to a first embodiment of the invention.

In one embodiment, as shown in detail in FIG. 4, utility vehicle automatic transmission powertrain mounting 100 may include front isolator 112 on a rear portion of vehicle frame 114 and supporting a forward portion of internal combustion engine 106. The front isolator may include damper 124 which may be bonded to isolator support plate 118, and also may include snubber cup or spacer 116 supporting the isolator support plate on a first horizontal member 115 of the vehicle frame. The front isolator also may include a pair of fasteners such as bolts 120 to secure the front isolator to the frame wherein the bolts may be inserted generally vertically through vehicle frame member 115, snubber cup or spacer 116, and isolator support plate 118, and tightened with nuts 122. The front isolator also may include a fastener such as bolt 128 to secure the front isolator to the engine wherein the bolt may be inserted generally vertically through limiting washer 129, damper support plate 118, damper 124, and front isolator mounting bracket 126, and tightened with nut 130. The limiting washer may limit movement of the damper if the limiting washer contacts the snubber cup or isolator support plate. The front isolator mounting bracket may extend upwardly and rearwardly from the front isolator, and is attached to a forward portion of the internal combustion engine. Threaded fasteners 132 may be inserted through the front isolator mounting bracket into internally threaded holes in the forward portion of the engine.

Figure 5:
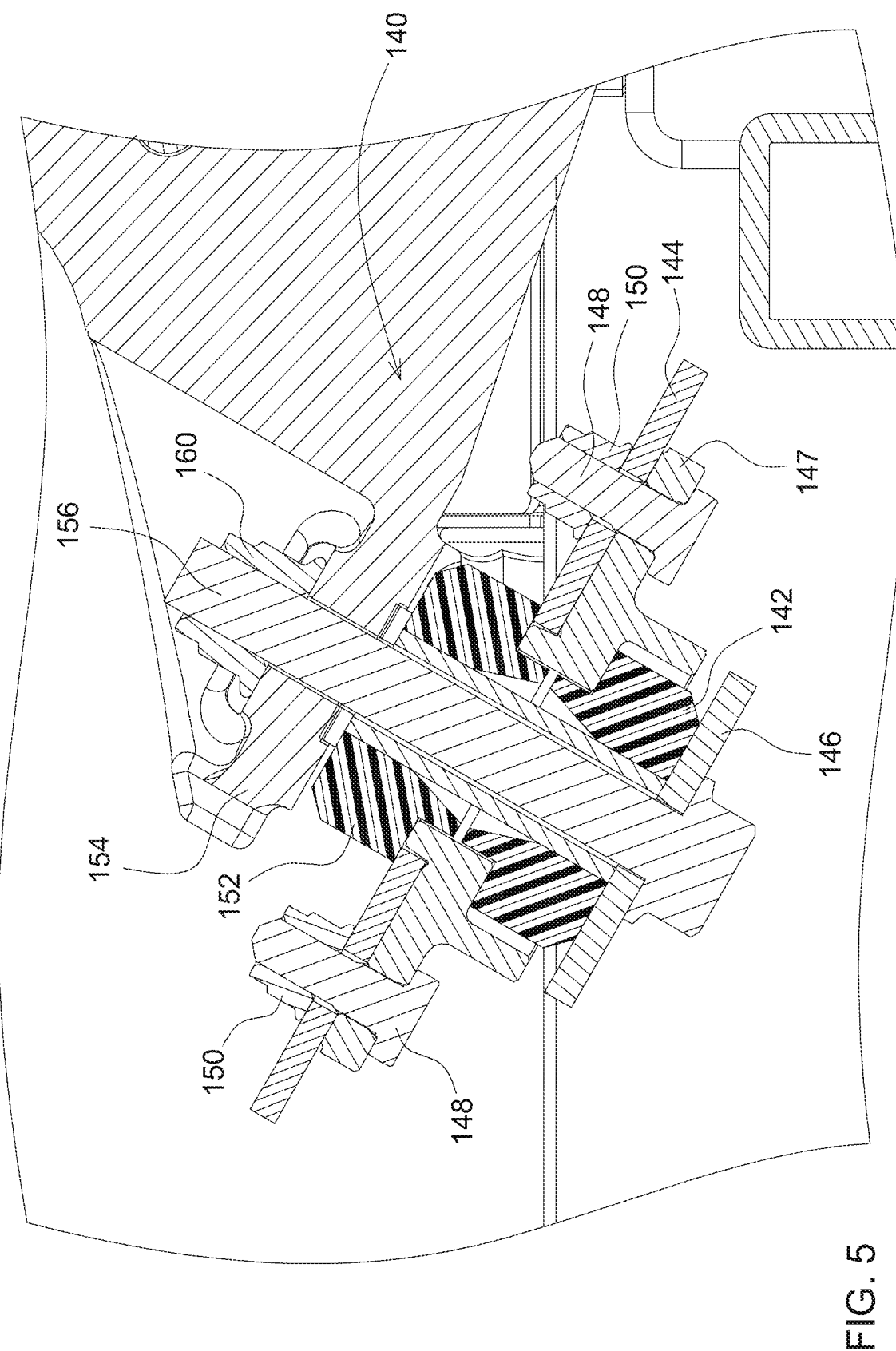
FIG. 5 is a cross section of a mid isolator of a utility vehicle automatic transmission powertrain mounting according to a first embodiment of the invention.

In one embodiment, as shown in detail in FIG. 5, utility vehicle automatic transmission powertrain mounting 100 may include a pair of mid isolators 140 on a pair of second inclined frame members 144. The pair of second inclined frame members may be on a rear portion of vehicle frame 114. Each of the mid isolators may be spaced laterally outwardly from the front isolator, with one on each side of the utility vehicle frame centerline, where each isolator may support adapter plate 110. Each mid isolator may include lower damper 142 and upper damper 152 compressed resiliently between adapter plate mounting surface 154 and limiting washer 146. A pair of fasteners such as bolts 148 may be inserted at an inclined orientation through openings in the isolator support plate and the second inclined frame member, and tightened with nuts 150. The second inclined frame member and bolts may be aligned between about 30 degrees and about 60 degrees from horizontal, or between about 10 degrees and 30 degrees from the vertical axis. Each mid isolator also may include upper damper 152 compressed resiliently between isolator support plate 147 and adapter plate mounting surface 154. A fastener such as bolt 156 may be inserted at the inclined orientation through openings in the limiting washer, lower damper, isolator support plate, second inclined frame member, upper damper, and adapter plate mounting surface, and tightened with nut 160. The adapter plate mounting surface may be adjacent a lower perimeter portion of the adapter plate, and bolt 156 may be transverse to the front and/or rear output shafts of the engine, and inclined inwardly and upwardly.

Figure 6:
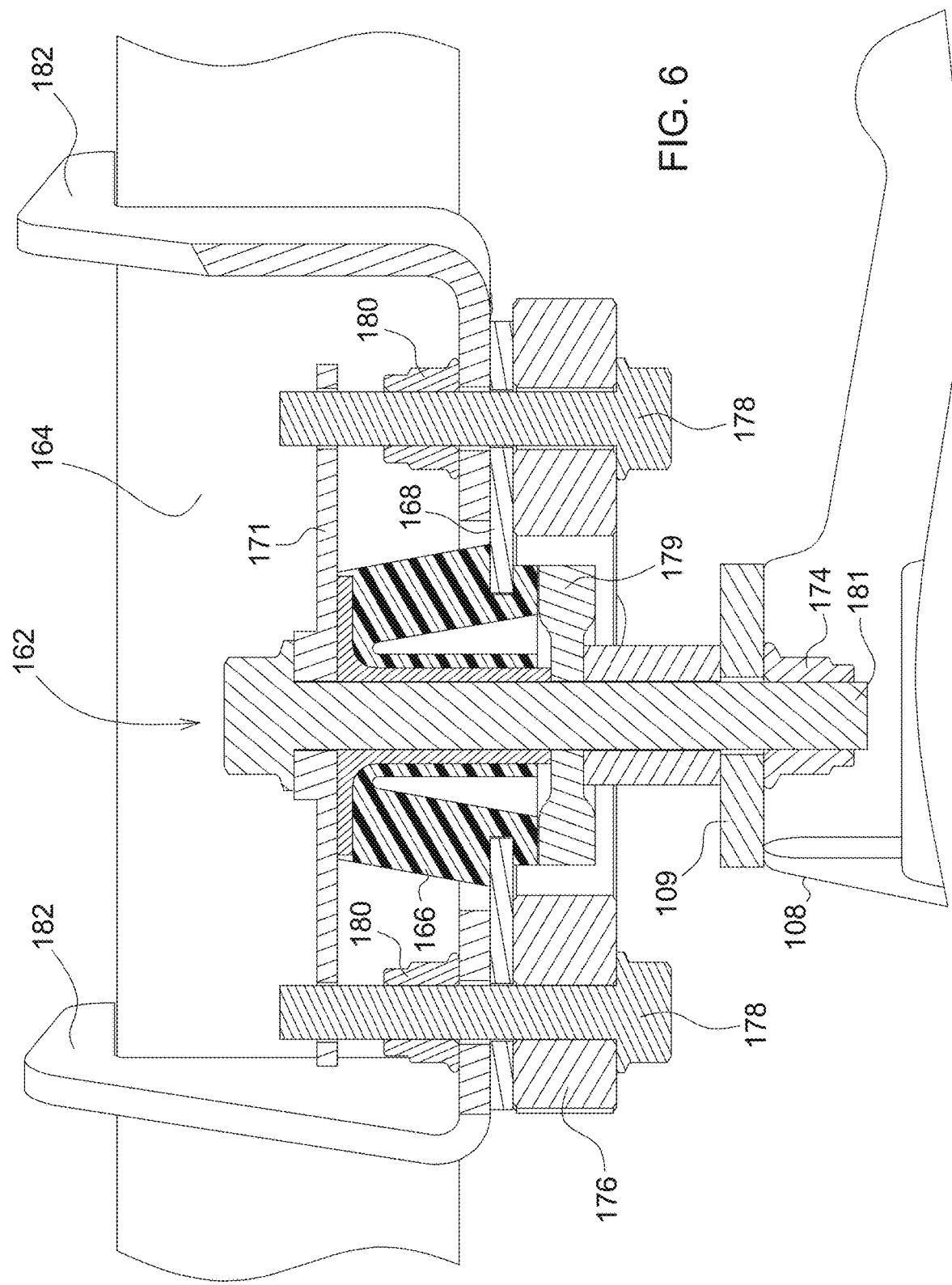
FIG. 6 is a cross section of a rear isolator of a utility vehicle automatic transmission powertrain mounting according to a first embodiment of the invention.

In one embodiment, as shown in detail in FIG. 6, utility vehicle automatic transmission powertrain mounting 100 may include rear upper isolator 162 on a third removable vehicle frame cross member 164. The third removable cross member may extend transversely or laterally across a rear portion of the utility vehicle frame above the transmission. The rear upper isolator also may be connected to the automatic transmission housing 108. The rear upper isolator may include damper 166 which may be bonded to isolator support plate 168, and also may include snubber cup or spacer 176 supporting the isolator support plate. The rear upper isolator also may include a fastener such as bolt 181 inserted generally vertically through upper plate 171, damper 166, isolator support plate 168, limiting washer 179 and rear upper isolator mounting bracket 109, and tightened with nut 174. The limiting washer may limit movement of the damper if the limiting washer contacts the snubber cup or isolator support plate. The rear upper isolator also may include a pair of fasteners such as bolts 178 inserted generally vertically through openings in the snubber cup or spacer 176, isolator support plate 168, and rear upper isolator mounting bracket 182, and tightened with nuts 180. The rear upper isolator mounting bracket may include a pair of arms 182 welded or secured to the removable vehicle frame cross member. Each end 184, 186 of the cross member may be bolted or removably attached with other mechanical fasteners to one of the longitudinal members of the vehicle frame. The cross member may extend over the automatic transmission, and may be removed to service or remove the transmission.

Having described the preferred embodiment, it will become apparent that various modifications can be made without departing from the scope of the invention as defined in the accompanying claims.

The invention claimed is:

1. A utility vehicle automatic transmission powertrain mounting, comprising:
    a front isolator on a first frame member of a rear portion of a utility vehicle frame; the front isolator connected to a front portion of an engine;
    a pair of mid isolators, each mid isolator on a second inclined frame member of the rear portion of the utility vehicle frame; each mid isolator connected to a left side or a right side of an adapter plate between the engine and an automatic transmission; and
    a rear isolator on a third frame member on the rear portion of the utility vehicle frame; the rear isolator connected to the automatic transmission.

2. The utility vehicle automatic transmission powertrain mounting of claim 1 wherein the third frame member is removably attached to the rear portion of the utility vehicle frame.

3. The utility vehicle automatic transmission powertrain mounting of claim 1 wherein the third frame member extends transversely over the automatic transmission.

4. The utility vehicle automatic transmission powertrain mounting of claim 1 wherein the engine is mounted forwardly of the automatic transmission.

5. The utility vehicle automatic transmission powertrain mounting of claim 1 wherein the front isolator, the pair of mid isolators, and the rear isolator are positioned in a diamond shaped configuration.

6. A utility vehicle automatic transmission powertrain mounting, comprising:
   a plurality of isolators aligned in a diamond shaped configuration on a rear portion of a utility vehicle frame;
   at least two of the isolators connected to a left side and a right side of an adapter plate between an internal combustion engine and an automatic transmission.

7. The utility vehicle automatic transmission powertrain mounting of claim 6 wherein at least one of the plurality of isolators is on a removable frame member.

8. The utility vehicle automatic transmission powertrain mounting of claim 6 wherein at least one of the plurality of isolators is on an inclined frame member.

9. A utility vehicle automatic transmission powertrain mounting, comprising:
   a front isolator connected to an internal combustion engine;
   a pair of mid isolators connected to a left side and a right side of an adapter plate between the internal combustion engine and an automatic transmission;
   a rear isolator connected to the automatic transmission;
   each of the isolators is on a frame member of a rear portion of an off road or recreational utility vehicle frame.

10. The utility vehicle automatic transmission powertrain mounting of claim 9 wherein each of the pair of mid isolators are on an inclined frame member.

11. The utility vehicle automatic transmission powertrain mounting of claim 9 wherein the rear isolator is on a removable frame member.

12. The utility vehicle automatic transmission powertrain mounting of claim 9 wherein the pair of mid isolators are spaced laterally from a centerline of the off road or recreational utility vehicle frame.

* * * * *